(12) United States Patent
Katoh

(10) Patent No.: US 12,116,001 B2
(45) Date of Patent: Oct. 15, 2024

(54) INFORMATION COLLECTION DEVICE, INFORMATION COLLECTION SYSTEM, INFORMATION COLLECTION METHOD, AND STORAGE MEDIUM STORING PROGRAM

(71) Applicant: TOYOTA JIDOSHA KABUSHIKI KAISHA, Toyota (JP)

(72) Inventor: Yoshihiko Katoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 487 days.

(21) Appl. No.: 17/522,549

(22) Filed: Nov. 9, 2021

(65) Prior Publication Data

US 2022/0194396 A1 Jun. 23, 2022

(30) Foreign Application Priority Data

Dec. 18, 2020 (JP) ................. 2020-210722

(51) Int. Cl.
*H04L 29/06* (2006.01)
*B60W 50/02* (2012.01)
*H04L 9/40* (2022.01)
*H04L 67/12* (2022.01)

(52) U.S. Cl.
CPC ..... *B60W 50/0205* (2013.01); *H04L 63/1425* (2013.01); *H04L 67/12* (2013.01)

(58) Field of Classification Search
CPC ....................... B60W 50/0205; H04L 63/1425; H04L 67/12; H04W 4/40; H04W 12/121; G05B 23/0262; G05B 2219/24065
See application file for complete search history.

(56) References Cited

U.S. PATENT DOCUMENTS

| | | | |
|---|---|---|---|
| 2017/0180370 A1 | 6/2017 | Satoh et al. | |
| 2018/0279141 A1* | 9/2018 | Morhart | H04W 24/06 |
| 2019/0238586 A1* | 8/2019 | Hong | H04L 12/40 |
| 2020/0389469 A1* | 12/2020 | Litichever | H04W 4/40 |
| 2021/0021610 A1* | 1/2021 | Ahire | H04L 67/12 |
| 2021/0160270 A1* | 5/2021 | Minami | H04L 12/66 |
| 2022/0046114 A1* | 2/2022 | Entelis | H04L 12/40 |
| 2022/0263709 A1* | 8/2022 | Hirano | H04L 43/026 |

FOREIGN PATENT DOCUMENTS

| | | | |
|---|---|---|---|
| CN | 110007658 A | * | 7/2019 |
| JP | 2017-118487 A | | 6/2017 |

* cited by examiner

*Primary Examiner* — Ka Shan Choy

(74) *Attorney, Agent, or Firm* — Oliff PLC

(57) ABSTRACT

An information collection device including a processor and a communication unit that communicates with a control device installed at a vehicle. The processor is configured to send a message in a specific way to the control device that is in a test mode, receive from the control device a determination result about a state of the control device which has been determined based on the message sent in the specific way, send another message in a usual way to the control device in a case in which the determination result indicates that the state of the control device is normal, and receive, from the control device, anomaly information relating to communication in the control device, in response to the other message sent in the usual way.

11 Claims, 12 Drawing Sheets

INFORMATION COLLECTION DEVICE, INFORMATION COLLECTION SYSTEM, INFORMATION COLLECTION METHOD, AND STORAGE MEDIUM STORING PROGRAM

CROSS-REFERENCE TO RELATED APPLICATION

This application is based on and claims priority under 35 USC 119 from Japanese Patent Application No. 2020-210722 filed on Dec. 18, 2020, the disclosure of which is incorporated by reference herein.

BACKGROUND

Technical Field

This disclosure relates to an information collection device, an information collection system, an information collection method, and a storage medium storing a program.

Related Art

When collecting attack information pertaining to a security attack on an in-vehicle LAN, it is conceivable to use a security function such as message authentication or a firewall to detect the security attack and use a center device, for example, to collect attack information accompanying the attack. This allows the center device to analyze the attack information it has collected.

For example, Japanese Patent Application Laid-open (JP-A) No. 2017-118487 discloses a method where, when collecting attack information pertaining to a security attack such as unauthorized access to ECUs in a vehicle, the center device collects information after excluding anomaly information that has arisen due to a circuit fault or the like.

In this method, based on information received from the ECUs the center device generates a message authentication code, sends it the ECUs, and judges whether or not circuits are normal based on whether the message authentication code matches or does not match in the ECUs.

The method of JP-A No. 2017-118487 can detect security attacks that appear as message authentication code anomalies, but sometimes it cannot detect other security attacks, such as hypertext transfer protocol secure (HTTPS) communication impersonations. For that reason, there is room for improvement with respect to excluding, from anomaly information relating to communication in a case where an anomaly has arisen in communication, anomaly information caused by a faulty ECU and collecting anomaly information at the time of a security attack.

SUMMARY

It is an object of this disclosure to provide an information collection device, an information collection system, an information collection method, and a storage medium storing a program that can exclude anomaly information relating to communication attributable to a device in a vehicle and collect anomaly information at the time of a security attack from outside the vehicle.

A first aspect is an information collection device including a processor and a communication unit that communicates with a control device installed at a vehicle, the processor being configured to: send a message in a specific way to the control device, the control device being in a test mode; receive from the control device a determination result about a state of the control device which has been determined based on the message sent in the specific way; send another message in a usual way to the control device in a case in which the determination result indicates that the state of the control device is normal; and receive, from the control device, anomaly information relating to communication in the control device, in response to the other message sent in the usual way.

The information collection device of the first aspect includes the processor and the communication unit, and the communication unit communicates with the control device installed at the vehicle. When the control device switches to the test mode, in the information collection device the processor sends a message in a specific way to the control device and receives from the control device a determination result about the state of the control device which has been determined based on the message sent in the specific way. Here, sending a message in a specific way includes sending a message outside of a predetermined communication method and sending an invalid message to the control device. Additionally, the processor sends another message in a usual way to the control device in a case in which the determination result the processor has received indicates that the state of the control device is normal, and receives anomaly information, relating to communication in the control device, sent from the control device in correspondence to the other message sent in the usual way. Here, sending another message in a usual way includes sending a message using a predetermined communication method and sending a valid message to the control device.

The information collection device of the first aspect checks that the control device is normal by sending the message in the specific way to the control device and next receives the anomaly information relating to communication in the control device by sending the other message in the usual way. In a case in which the control device does not respond even when the information collection device sends the other message in the usual way, it is possible to discriminate a fault in the control device, but with this information collection device it is also possible to discriminate a fault in the control device by sending the message in the specific way. For that reason, according to this information collection device, detection accuracy pertaining to a fault in the control device can be enhanced by plural message transmissions, and anomaly information about communication attributable to a device in the vehicle can be excluded so that the anomaly information at the time of a security attack from outside the vehicle can be collected.

An information collection device of a second aspect is the information collection device of the first aspect, wherein the processor sends the message to the control device outside of a predetermined communication method as the specific way, and receives from the control device a determination result in which the state of the control device has been determined to be normal based on the message sent outside of the predetermined communication method.

In the information collection device of the second aspect, sending the message according to the specific way is specified as sending the message according to the predetermined communication method. Here, the predetermined communication method includes HTTPS communication using a valid certificate and communication using a protocol determined beforehand. According to this information collection device, when collecting the anomaly information at the time of a security attack, anomaly information caused by a fault in the control device in which communication is established in spite of the fact that it is outside of the predetermined communication method can be excluded from the collection target.

An information collection device of a third aspect is the information collection device of the second aspect, wherein the processor: in a case in which the determination result based on the message sent outside of the predetermined communication method indicates that the state of the control device is normal, sends the other message to the control device using the predetermined communication method as the usual way, and receives the anomaly information from the control device as a result of the state of the control device having been determined to be normal based on the message sent using the predetermined communication method.

The information collection device of the third aspect checks that the control device is normal by sending the message outside of the predetermined communication method, further checks that the control device is normal by sending the other message using the predetermined communication method, and then acquires the anomaly information. According to this information collection device, when collecting the anomaly information at the time of a security attack, anomaly information caused by a fault in the control device in which communication is established in spite of the fact that it is outside of the predetermined communication method and a fault in the control device in which communication is not established in spite of the fact that it uses the predetermined communication method can be excluded from the collection target.

An information collection device of a fourth aspect is the information collection device of any one of the first to third aspects, wherein the processor: sends to the control device an invalid message as the message sent in the specific way, and receives from the control device a determination result in which the state of the control device has been determined to be normal based on the invalid message.

In the information collection device of the fourth aspect, sending the message according to the specific way is specified as sending an invalid message. Here, the invalid message includes commands that are never executed in the specific control device and commands in which the device ID for identifying the control device is different. According to this information collection device, when collecting the anomaly information at the time of a security attack, anomaly information caused by a fault in which an invalid message is recognized as a valid message can be excluded from the collection target.

An information collection device of a fifth aspect is the information collection device of the fourth aspect, wherein the processor: in a case in which the determination result based on the invalid message indicates that the state of the control device is normal, sends a valid message as the other message sent in the usual way, and receives the anomaly information sent from the control device as a result of the state of the control device having been determined to be normal based on the valid message.

The information collection device of the fifth aspect checks that the control device is normal by sending an invalid message, further checks that the control device is normal by sending a valid message, and then acquires the anomaly information. According to this information collection device, when collecting the anomaly information at the time of a security attack, anomaly information caused by a fault in which an invalid message is recognized as a valid message and a fault in which a valid message is recognized as an invalid message can be excluded from the collection target.

An information collection device of a sixth aspect is the information collection device of any one of the first to fifth aspects, wherein, in a case in which the processor is acquiring the anomaly information in a case in which the state of the control device is anomalous, the processor discards the anomaly information.

According to the information collection device of the sixth aspect, the information collection device discards the anomaly information in a case in which the processor has acquired the anomaly information in spite of the fact that the control device is faulty, whereby anomaly information accompanying a fault in the device can be excluded from the target when analyzing a security attack.

An information collection system of a seventh aspect includes the information collection device of any one of the first to sixth aspects and a control device that controls a vehicle, wherein the control device: switches to the test mode to diagnose the control device in a case in which safety of the vehicle will not be affected, and executes a process to determine the state of the control device based on the messages received from the information collection device.

In the information collection system of the seventh aspect, the control device starts the diagnosis in a case in which safety of the vehicle will not be affected and executes the process to determine the state of the control device based on the messages received from the information collection device. In a case in which the control device has switched to the test mode and the diagnosis has been started, there is the concern that the security of the control device will be vulnerable due to the message being sent in the specific way. However, according to this information collection system, by collecting the anomaly information at the time of a security attack in a case in which safety of the vehicle will not be affected, safety with respect to driving the vehicle can be ensured.

An eighth aspect is an information collection method by which an information collection device connected to a control device installed at a vehicle collects information about the control device by communicating with the control device, the information collection method including a computer performing a process of: sending a message in a specific way to the control device that is in a test mode; receiving from the control device a determination result about a state of the control device which has been determined based on the message sent in the specific way; sending another message in a usual way to the control device in a case in which the determination result indicates that the state of the control device is normal; and receiving, from the control device, anomaly information relating to communication in the control device, in response to the other message sent in the usual way.

The information collection method of the eighth aspect allows the information collection device connected to the control device installed at the vehicle to collect information about the control device by communicating with the control device. In this information collection method, when the control device switches to the test mode, the computer sends a message in a specific way to the control device and receives from the control device a determination result about the state of the control device which has been determined based on the message sent in the specific way. Additionally, the computer sends another message in a usual way to the control device in a case in which the determination result the computer has received indicates that the state of the control device is normal, and receives anomaly information, relating to communication in the control device, sent from the control device in correspondence to the other message sent in the usual way. Here, the specific way and the usual way are as described above.

The information collection method of the eighth aspect checks that the control device is normal by sending the message in the specific way to the control device and next receives the anomaly information relating to communication in the control device by sending the other message in the usual way. In a case in which the control device does not respond even when the information collection device sends the other message in the usual way, it is possible to discriminate a fault in the control device, but with this information collection device it is also possible to discriminate a fault in the control device by sending the message in the specific way. For that reason, according to this information collection method, detection accuracy pertaining to a fault in the control device can be enhanced by plural message transmissions, and anomaly information about communication attributable to a device in the vehicle can be excluded so that the anomaly information at the time of a security attack from outside the vehicle can be collected.

A ninth aspect is a non-transitory storage medium storing a program. The program is a program by which an information collection device connected to a control device installed at a vehicle collects information about the control device by communicating with the control device, the program being executable by a computer to perform a process including: sending a message in a specific way to the control device that is in a test mode; receiving from the control device a determination result about a state of the control device which has been determined based on the message sent in the specific way; sending another message in a usual way to the control device in a case in which the determination result indicates that the state of the control device is normal; and receiving, from the control device, anomaly information relating to communication in the control device, in response to the other message sent in the usual way.

The program of the ninth aspect executes a computer to perform a process by which the information collection device connected to the control device installed at the vehicle collects information about the control device by communicating with the control device. In the computer in which the program is executed, when the control device switches to the test mode, the computer sends a message in a specific way to the control device and receives from the control device a determination result about the state of the control device which has been determined based on the message sent in the specific way. Additionally, the computer sends another message in a usual way to the control device in a case in which the determination result the computer has received indicates that the state of the control device is normal, and receives anomaly information, relating to communication in the control device, sent from the control device in correspondence to the other message sent in the usual way. Here, the specific way and the usual way are as described above.

The computer in which the program of the ninth aspect is executed checks that the control device is normal by sending the message in the specific way to the control device and next receives the anomaly information relating to communication in the control device by sending the other message in the usual way. In a case in which the control device does not respond even when the computer sends the other message in the usual way, it is possible to discriminate a fault in the control device, but with this information collection device it is also possible to discriminate a fault in the control device by sending the message in the specific way. For that reason, according to the storage medium in which this program is stored, detection accuracy pertaining to a fault in the control device can be enhanced by plural message transmissions, and anomaly information about communication attributable to a device in the vehicle can be excluded so that the anomaly information at the time of a security attack from outside the vehicle can be collected.

According to this disclosure, anomaly information about communication attributable to a device in a vehicle can be excluded so that the anomaly information at the time of a security attack from outside the vehicle can be collected.

BRIEF DESCRIPTION OF THE DRAWINGS

Exemplary embodiments of the present disclosure will be described in detail based on the following figures, wherein.

DETAILED DESCRIPTION

First Embodiment

Figure 1:
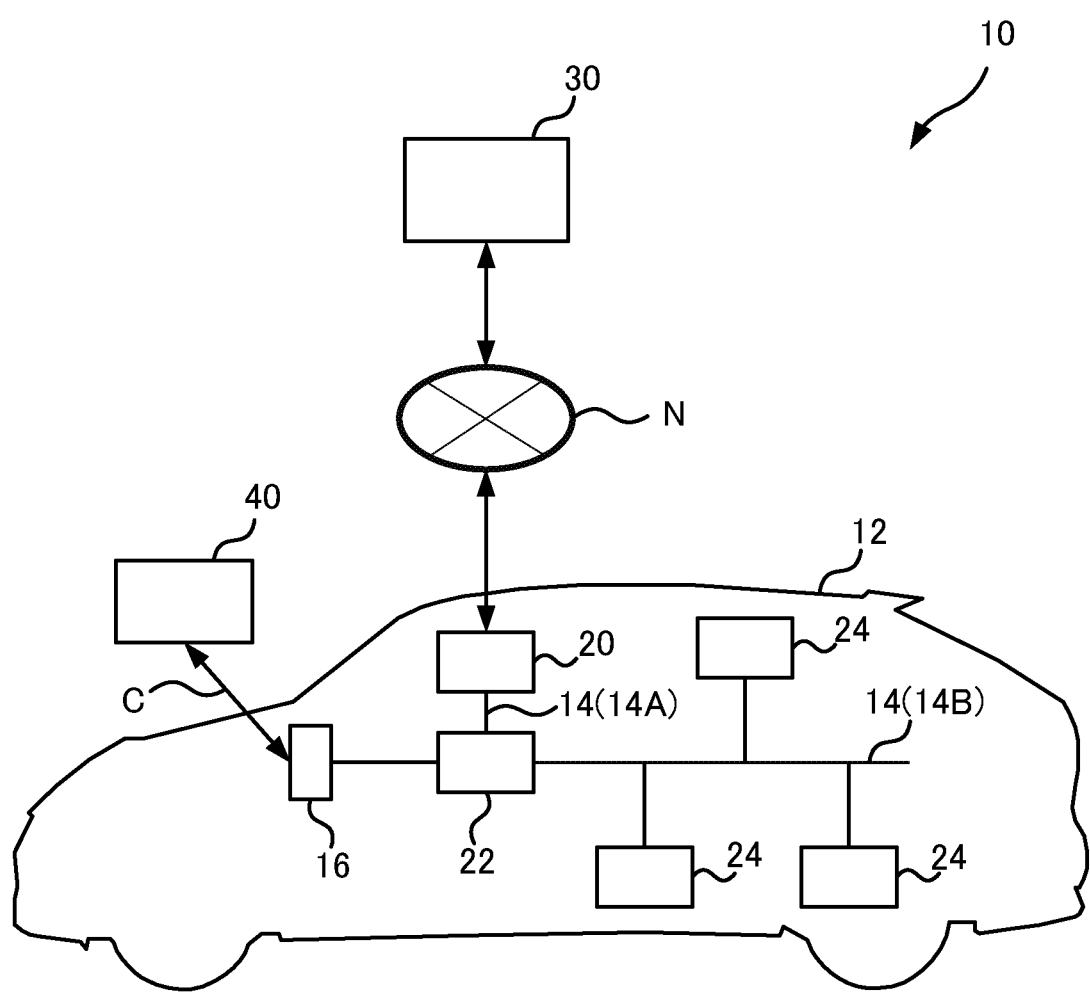
FIG. 1 is a drawing showing the schematic configuration of an information collection system pertaining to a first embodiment.

FIG. 1 is a block diagram showing the schematic configuration of an information collection system 10 pertaining to a first embodiment.

(Overview)

As shown in FIG. 1, the information collection system 10 pertaining to the first embodiment is configured to include a vehicle 12, a center server 30 serving as an information collection device, and a vehicle diagnostic device 40.

The vehicle 12 of this embodiment is equipped with a data communication module (DCM) 20, a central gateway (GW) 22, and plural electronic control units (ECUs) 24. The DCM 20 is an example of a control device.

The DCM 20 is connected to the center server 30 via a network N that is a communication network.

The central GW 22 is connected to the DCM 20 and each of the ECUs 24 via an external bus 14. The external bus 14 has a first bus 14A, which interconnects the central GW 22 and the DCM 20, and a second bus 14B, which connects the central GW 22 and each of the ECUs 24 to each other. Communication using the Controller Area Network (CAN) protocol takes place on the external bus 14.

The ECUs 24 are devices needed to control the vehicle 12 or control accessories installed at the vehicle 12. The ECUs 24 are, for example, ECUs such as a body ECU, an engine ECU, a transmission ECU, a meter ECU, a multimedia ECU, and a smart key ECU.

Furthermore, the central GW 22 is connected to a connector (a data link connector, or DLC) 16. The vehicle diagnostic device 40, which is a diagnostic tool, can be connected to the connector 16 via a cable C.

(DCM)

Figure 2:
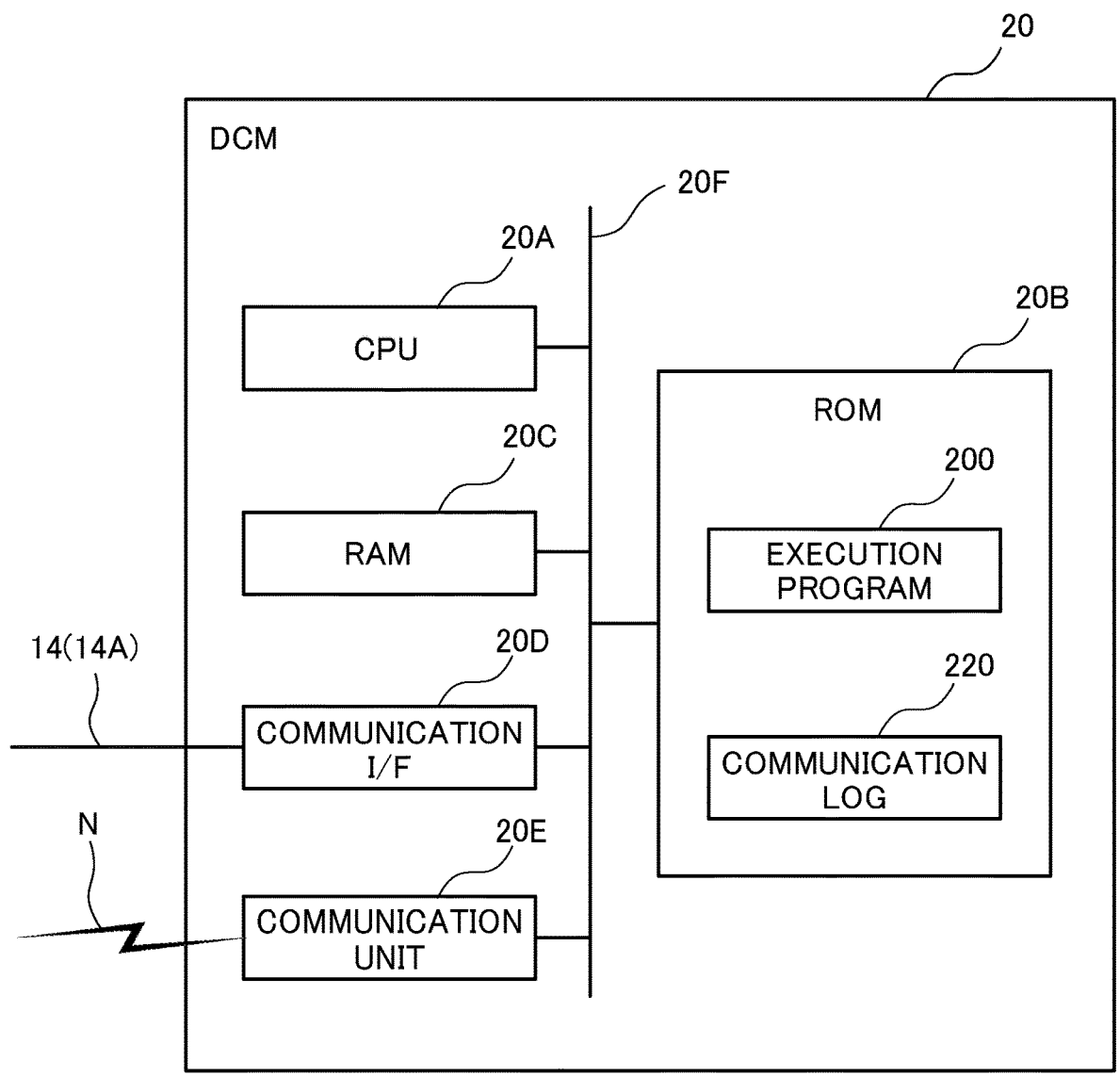
FIG. 2 is a block diagram showing hardware configurations of a DCM of the first embodiment.

As shown in FIG. 2, the DCM 20 is configured to include a central processing unit (CPU) 20A, a read-only memory (ROM) 20B, a random-access memory (RAM) 20C, a communication interface (I/F) 20D, and a communication unit 20E. The CPU 20A, the ROM 20B, the RAM 20C, the communication I/F 20D, and the communication unit 20E are communicably connected to each other via an internal bus 20F.

The CPU 20A is a central processing unit, executes various types of programs, and controls each part of the DCM 20. That is, the CPU 20A reads programs from the ROM 20B and executes the programs using the RAM 20C as a workspace.

The ROM 20B stores various types of programs and various types of data. In this embodiment, an execution program 200 is stored in the ROM 20B. The execution program 200 is a program for performing an information provision process described later. Furthermore, a communication log 220 is stored in the ROM 20B. The communication log 220 includes anomaly information that is information at the time of a communication anomaly in the communication unit 20E. The RAM 20C temporarily stores programs or data as a workspace.

The communication I/F 20D is an interface for connecting to the central GW 22 and other ECUs 24. The interface uses the CAN communication standard. The communication I/F 20D is connected to the first bus 14A.

The communication unit 20E is a wireless communication module for connecting to the center server 30. The wireless communication module uses a communication standard such as 5G, 4G, or LTE, for example. The communication unit 20E is connected to the network N.

Figure 3:
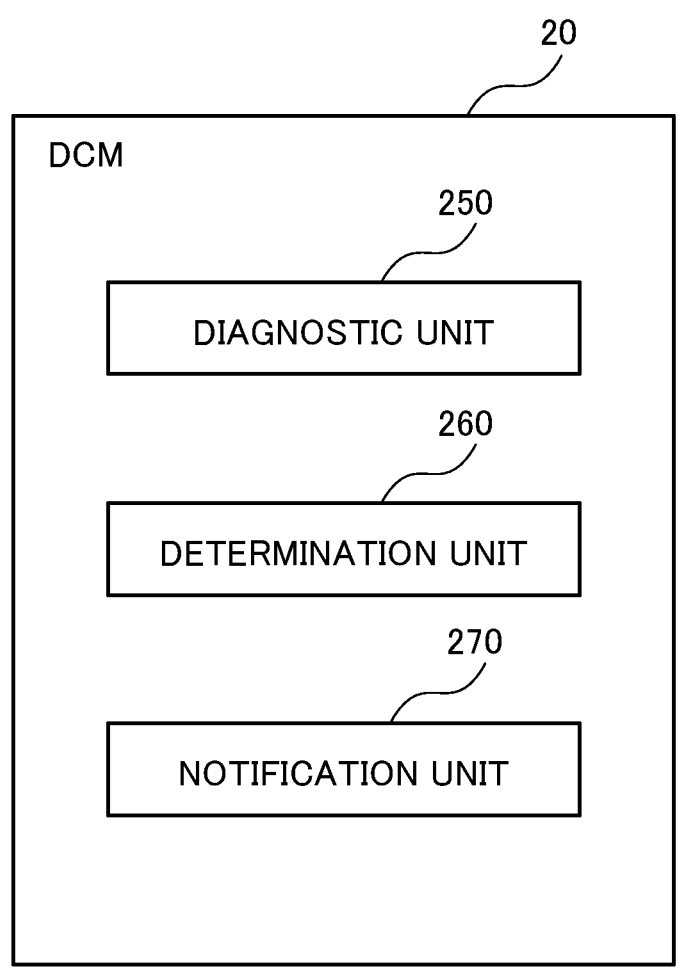
FIG. 3 is a block diagram showing an example of functional configurations of the DCM of the first embodiment.

FIG. 3 is a block diagram showing an example of functional configurations of the DCM 20. As shown in FIG. 3, the DCM 20 has a diagnostic unit 250, a determination unit 260, and a notification unit 270. Each of these functional configurations is realized as a result of the CPU 20A reading and executing the execution program 200 stored in the ROM 20B.

The diagnostic unit 250 has the function of executing a test mode for diagnosing the DCM 20. The diagnostic unit 250 switches to the test mode in a case where the safety of the vehicle 12 will not be affected when the diagnostic unit 250 has received a request to start the test mode from the center server 30. In this embodiment, □a case where the safety of the vehicle 12 will not be affected□means a case where the vehicle 12 is in a location where security pertaining to communication is ensured and the vehicle 12 is stopped. The diagnostic unit 250 can determine that the vehicle 12 is stopped based on vehicle speed information and parking information.

Examples of □a location where security pertaining to communication is ensured□ include locations where communication can be restricted, such as a maintenance building at a dealer or a garage at home, and which are less susceptible to security attacks such as unauthorized access. When the test mode is started, the diagnostic unit 250 performs control so that the vehicle 12 in which the DCM 20 is installed cannot be driven. For example, the diagnostic unit 250 can make the vehicle 12 undrivable by stopping the functions of the ECUs 24 to prohibit the engine from being started and/or prohibit the brakes from being released. Furthermore, the diagnostic unit 250 monitors the speed of, and position information relating to, the vehicle 12 in the test mode and ends the test mode in a case where the speed is no longer 0 or in a case where the vehicle 12 has left the dealer. In other words, the vehicle 12 can be driven as usual when the diagnostic unit 250 allows usual driving of the vehicle 12.

The determination unit 260 has the function of determining the state of the DCM 20 based on messages received from the center server 30. The determination unit 260 of this embodiment determines the state of the DCM 20 in a case where the DCM 20 has switched to the test mode. The determination unit 260, in a case where it has received an HTTPS communication request to which a certificate has been attached as a message, determines whether the state of the DCM 20 is normal or anomalous in accordance with whether or not HTTPS communication is established. Furthermore, the determination unit 260, in a case where it has received a predetermined command intended for the ECUs 24 as a message, determines whether the state of the DCM 20 is normal or anomalous in accordance with whether or not the predetermined command is executable in the ECUs 24.

The notification unit 270 has the function of notifying the center server 30 of the state of the DCM 20 determined by the determination unit 260. The notification unit 270, in a case where it has been determined by the determination unit 260 that the DCM 20 is normal, sends to the center server 30 a normal notification indicating that the DCM 20 is normal. Furthermore, the notification unit 270, in a case where it has been determined by the determination unit 260 that the DCM 20 is anomalous, sends to the center server 30 an anomalous notification indicating that the DCM 20 is anomalous.

(Center Server)

Figure 4:
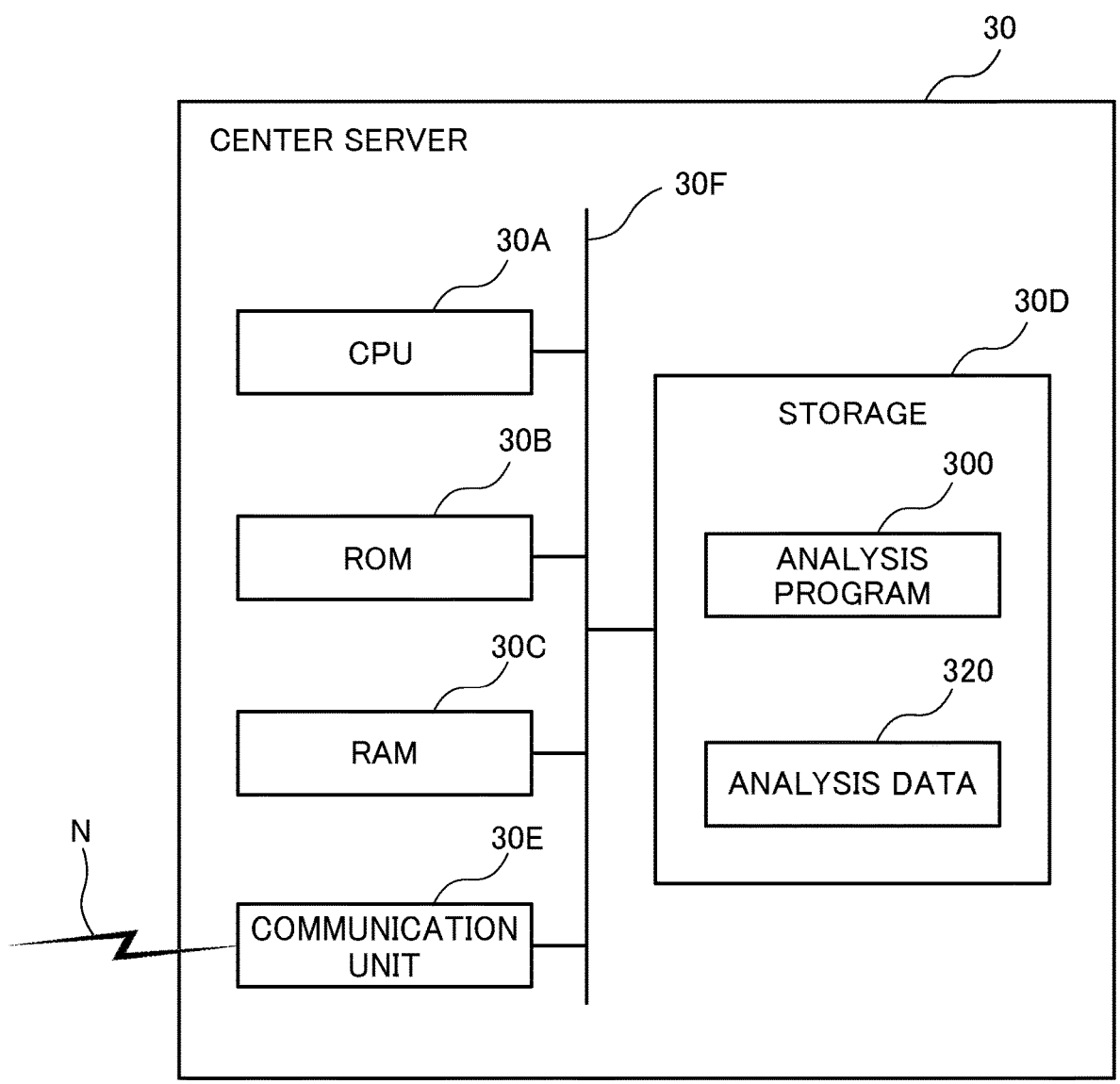
FIG. 4 is a block diagram showing hardware configurations of a center server of the first embodiment.

FIG. 4 is a block diagram showing hardware configurations of the center server 30 of this embodiment.

The center server 30 is configured to include a CPU 30A, a ROM 30B, a RAM 30C, a storage 30D, and a communication unit 30E. The CPU 30A, the ROM 30B, the RAM 30C, the storage 30D, and the communication unit 30E are communicably connected to each other via an internal bus 30F. The functions of the CPU 30A, the ROM 30B, the RAM 30C, and the communication unit 30E are the same as those of the CPU 20A, the ROM 20B, the RAM 20C, and the communication unit 20E of the DCM 20 described above. The CPU 30A is an example of a processor.

The storage 30D is configured by a hard disk drive (HDD) or a solid-state drive (SSD). An analysis program 300 and analysis data 320 are stored in the storage 30D of this embodiment. The analysis program 300 is a program for performing an information collection process described later. The analysis data 320 are data in which anomaly information collected from the DCM 20 are stored as results of the information collection process.

Figure 5:
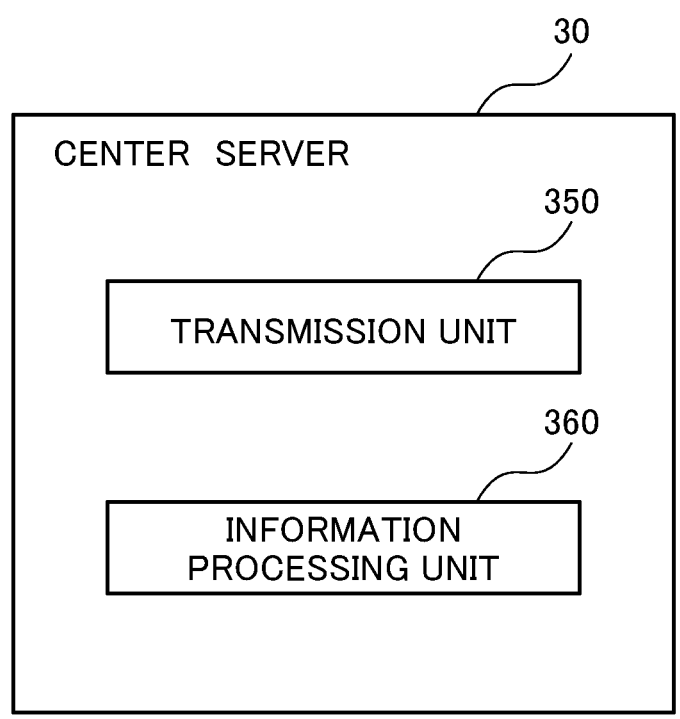
FIG. 5 is a block diagram showing an example of functional configurations of the center server of the first embodiment.

The CPU 30A of this embodiment reads the analysis program 300 from the storage 30D and executes the analysis program 300 using the RAM 30C as a workspace. The center server 30 functions as a transmission unit 350 and an information processing unit 360 shown in FIG. 5 as a result of the CPU 30A executing the analysis program 300.

The transmission unit 350 has the function of sending various types of messages to the DCM 20. Specifically, the transmission unit 350, when executing the test mode in the DCM 20, sends a request to start the test mode as a message.

Furthermore, the transmission unit 350 sends HTTPS communication requests to which certificates have been attached as messages when the DCM 20 is in the test mode. Here, when the transmission unit 350 sends the HTTPS communication requests, there are usually cases where the transmission unit 350 attaches an invalid certificate by which HTTPS communication is never established in the DCM 20 and usually cases where the transmission unit 350 attaches a valid certificate by which HTTPS communication is established in the DCM 20.

Invalid certificates include, for example, certificates whose data is corrupted, unsupported certificates, certificates that have been invalidated by a certifier, and expired certificates. Here, sending an HTTPS communication request to which an invalid certificate has been attached corresponds to sending a message in a specific way and sending a message outside of a predetermined communication method. Furthermore, sending an HTTPS communication request to which a valid certificate has been attached corresponds to sending a message in a usual way and sending a message using a predetermined communication method.

Moreover, the transmission unit 350 sends predetermined commands intended for the ECUs 24 as messages when the DCM 20 is in the test mode. Here, the predetermined commands include invalid commands that are invalid messages inexecutable in the ECUs 24 and valid commands that are valid messages executable in the ECUs 24. Examples of invalid commands include commands that are never executed in specific ECUs 24 and commands whose device IDs for identifying the ECUs 24 are different.

Here, sending an invalid command corresponds to sending a message in a specific way. Furthermore, sending a valid command corresponds to sending a message in a usual way.

The information processing unit 360 has the function of processing information received from the DCM 20. Specifically, the information processing unit 360 determines whether the DCM 20 is normal or anomalous as a device based on the normal notification or the anomalous notification it has received from the DCM 20. Furthermore, the information processing unit 360 acquires anomaly information relating to communication in the communication unit 20E of the DCM 20 from the DCM 20. It will be noted that in a case where the information processing unit 360 is acquiring the anomaly information in spite of the fact that the DCM 20 is anomalous, it discards the anomaly information it has acquired. Moreover, the information processing unit 360 stores the anomaly information it has acquired in the analysis data 320 and, based on the anomaly information, analyzes causes of attacks such as unauthorized access to the vehicle 12.

(Control Flow)

An example of the flow of the information provision process executed by the DCM 20 and the information collection process executed by the center server 30 in this embodiment will be described using the flowcharts of FIG. 6 to FIG. 9.

First, before the information provision process is executed, the DCM 20, if there has been unauthorized access for example, stores anomaly information about the communication in the communication log 220. Then, when an analysis of the anomaly information is to be performed in the center server 30, the following processes are executed in the DCM 20 and the center server 30.

Figure 6:
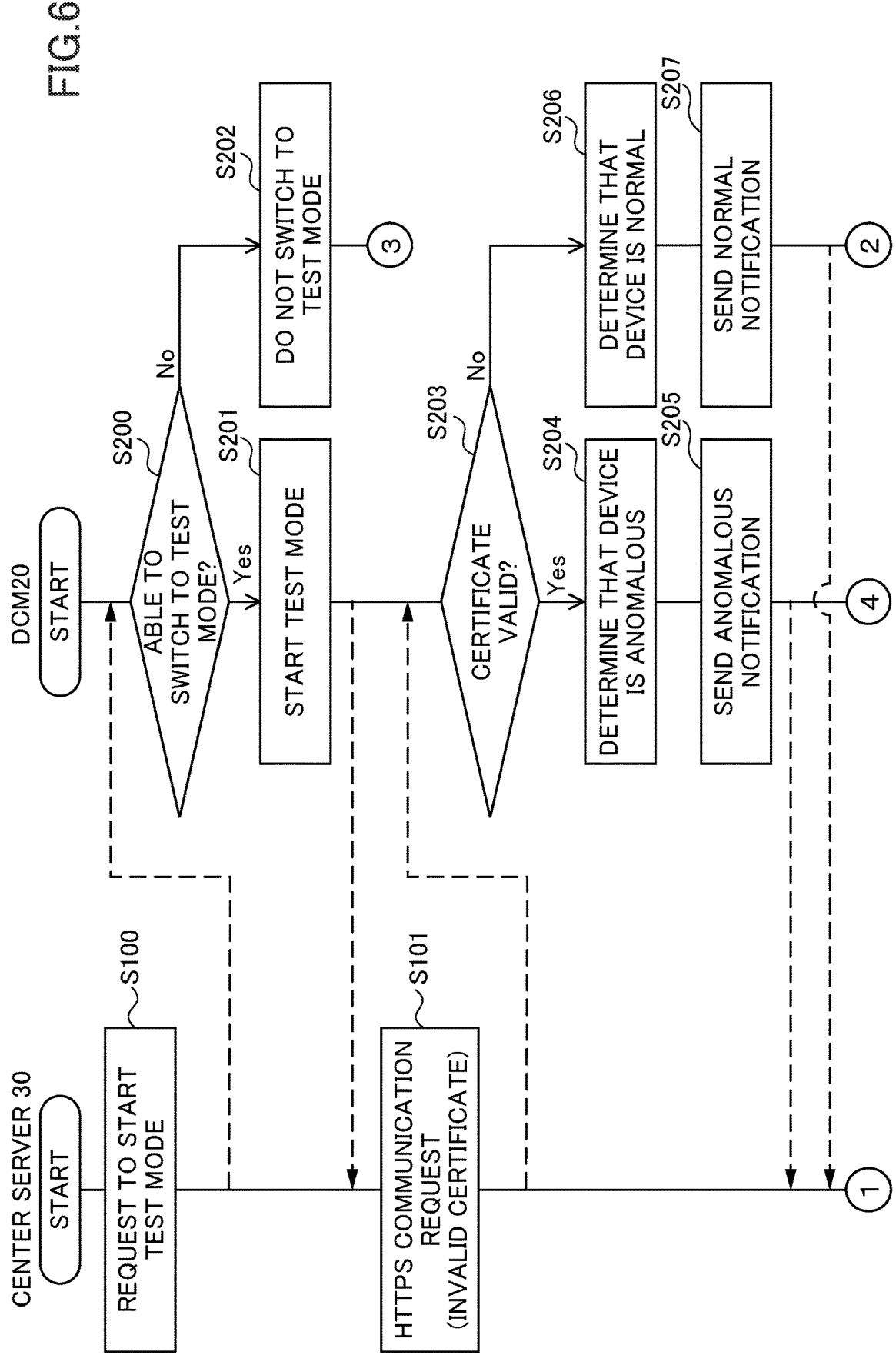
FIG. 6 is a flowchart showing the flow of an information provision process executed by the DCM and an information collection process executed by the center server in the first embodiment.

As shown in FIG. 6, the center server 30 sends a request to start the test mode to the subject DCM 20 from which it is to acquire the anomaly information (S100). Specifically, the center server 30 sends to the DCM 20 a command for starting the test mode.

In response thereto, the DCM 20 determines whether or not it is able to switch to the test mode (S200). Specifically, the DCM 20 determines that it is able to switch to the test mode in a case where the position information relating to the vehicle 12 indicates that the vehicle 12 is in a location less susceptible to security attacks such as unauthorized access, such as a maintenance building at a dealer or a garage at home, and the vehicle 12 is stopped. The DCM 20 starts the test mode (S201) in a case where it determines that it is able to switch to the test mode (YES in step S200). The DCM 20, as it starts the test mode, sends to the center server 30 a command indicating that it has started the test mode.

Figure 9:
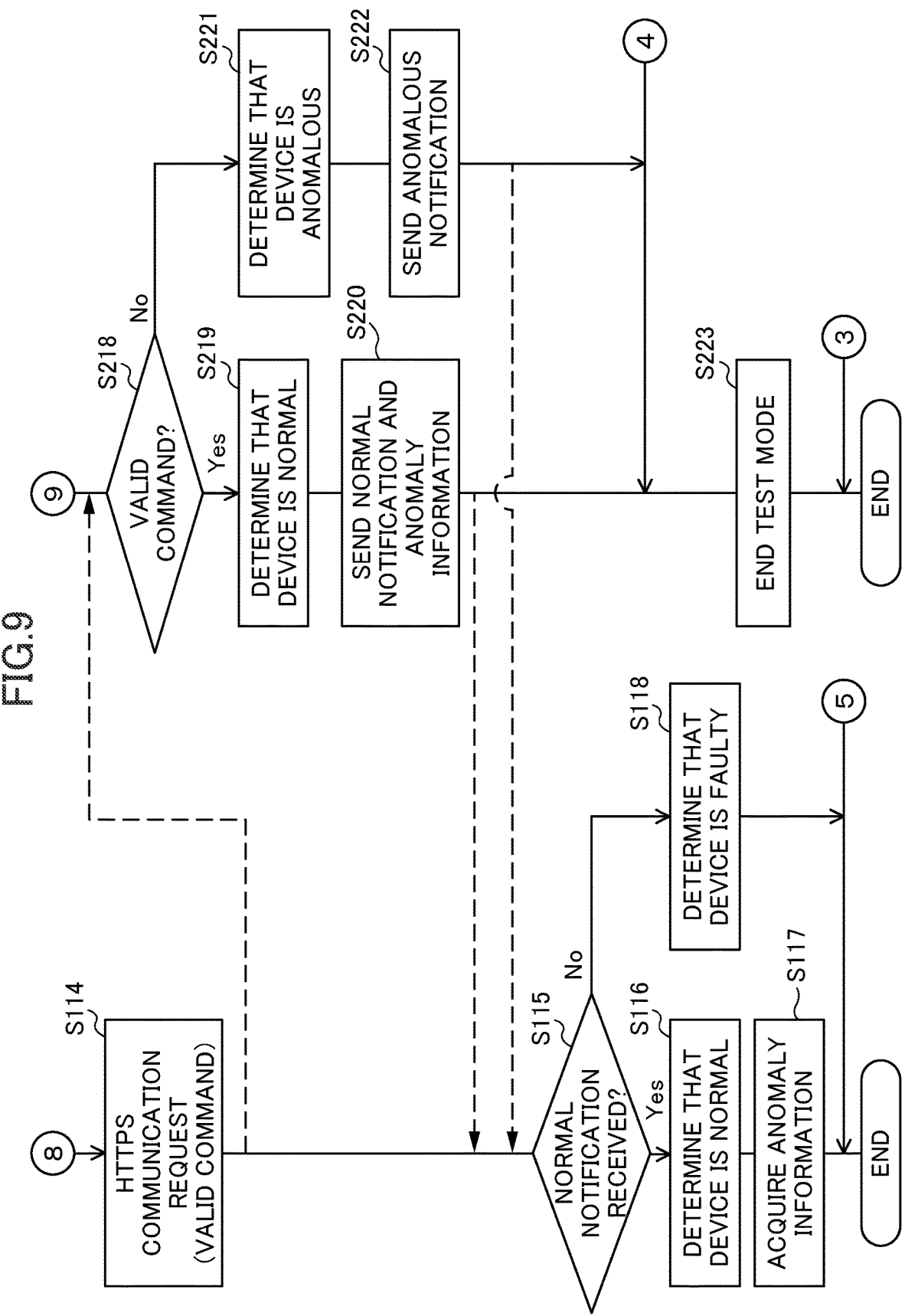
FIG. 9 is a flowchart (continued from FIG. 8) showing the flow of the information provision process executed by the DCM and the information collection process executed by the center server in the first embodiment.

In a case where, in the above determination, the DCM 20 determines that it is unable to switch to the test mode (NO in step S200), the DCM 20 does not switch to the test mode (S202) and ends the information provision process (see FIG. 9).

When the center server 30 receives from the DCM 20 the command indicating that the DCM 20 has started the test mode, the center server 30 sends an HTTPS communication request to which it has attached an invalid certificate (S101).

When the DCM 20 receives the HTTPS communication request from the center server 30, the DCM 20 determines whether or not the certificate attached thereto is a valid certificate by which an HTTPS communication session is established (S203). In a case where the DCM 20 determines that the certificate is valid (YES in S203), the DCM 20 determines that the device is anomalous (S204). Then, the DCM 20 sends to the center server 30 an anomalous notification indicating that the DCM 20 is anomalous (S205). Then, the test mode ends (see S223 in FIG. 9).

In a case where, in the above determination, the DCM 20 determines that the certificate is not valid but is invalid (NO in S203), the DCM 20 determines that the device is normal (S206). Then, the DCM 20 sends to the center server 30 a normal notification indicating that the DCM 20 is normal (S207).

Figure 7:
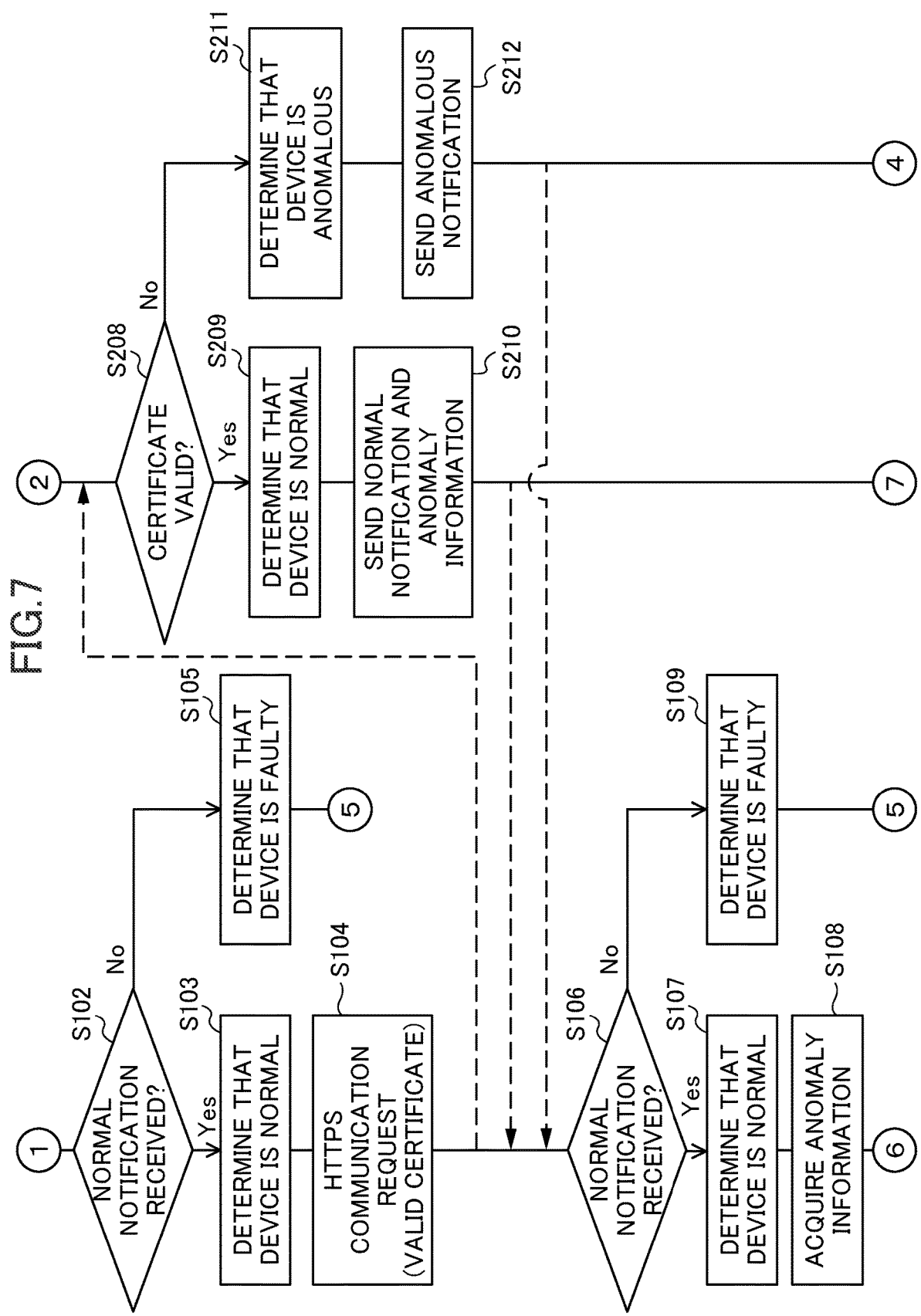
FIG. 7 is a flowchart (continued from FIG. 6) showing the flow of the information provision process executed by the DCM and the information collection process executed by the center server in the first embodiment.

As shown in FIG. 7, next, the center server 30 determines whether or not it has received a normal notification from the DCM 20 (S102). In a case where the center server 30 determines that it has received a normal notification from the DCM 20 (YES in S102), the center server 30 determines that the device is normal (S103). Then, the center server 30 sends an HTTPS communication request to which it has attached a valid certificate (S104).

In a case where, in the above determination, the center server 30 determines that it has not received a normal notification☐that is, that it has received an anomalous notification☐from the DCM 20 (NO in S102), the center server 30 determines that the device is faulty (S105). Then, the center server 30 ends the information collection process (see FIG. 9).

When the DCM 20 receives the HTTPS communication request from the center server 30, the DCM 20 determines whether or not the certificate attached thereto is a valid certificate by which an HTTPS communication session is established (S208). In a case where the DCM 20 determines that the certificate is valid (YES in S208), the DCM 20 determines that the device is normal (S209). Then, the DCM 20 sends a normal notification indicating that the DCM 20 is normal together with the anomaly information to the center server 30 (S210).

In a case where, in the above determination, the DCM 20 determines that the certificate is not valid but is invalid (NO in S208), the DCM 20 determines that the device is anomalous (S211). Then, the DCM 20 sends to the center server 30 an anomalous notification indicating that the DCM 20 is anomalous (S212). Then, the test mode ends (see S223 in FIG. 9).

Next, the center server 30 determines whether or not it has received a normal notification from the DCM 20 (S106). In a case where the center server 30 determines that it has received a normal notification from the DCM 20 (YES in S106), the center server 30 determines that the device is normal (S107). Then, the center server 30 acquires the anomaly information it has received together with the normal notification (S108).

In a case where, in the above determination, the center server 30 determines that it has not received a normal notification☐that is, that it has received an anomalous notification☐from the DCM 20 (NO in step S106), the center server 30 determines that the device is faulty (S109). Then, the center server 30 ends the information collection process (see FIG. 9).

Figure 8:
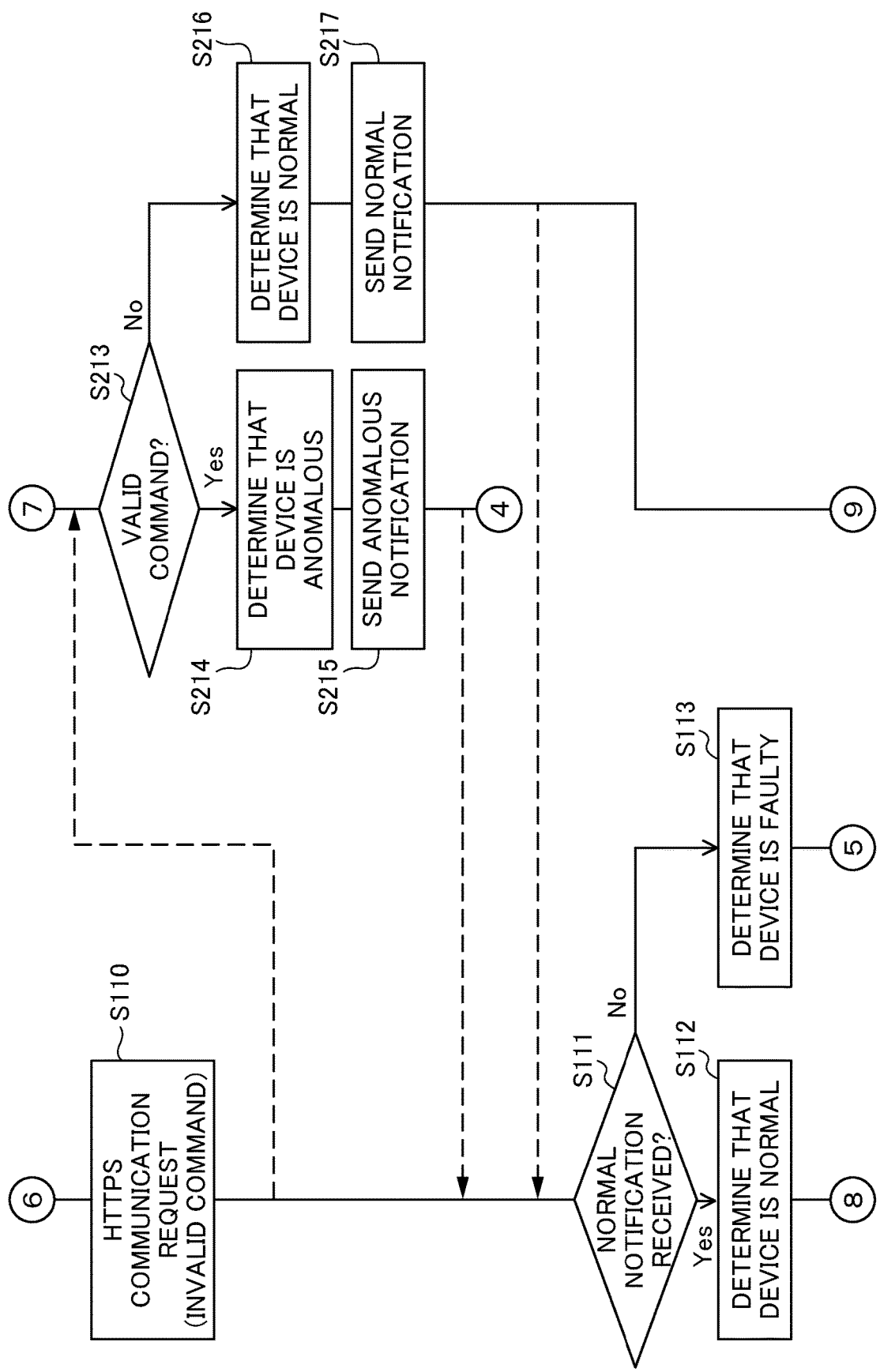
FIG. 8 is a flowchart (continued from FIG. 7) showing the flow of the information provision process executed by the DCM and the information collection process executed by the center server in the first embodiment.

As shown in FIG. 8, the center server 30 next sends an HTTPS communication request that is an invalid command (S110).

The DCM 20 determines whether or not the HTTPS communication request it has received from the center server 30 is a valid command (S213). In a case where the DCM 20 determines that the command it has received is a valid command (YES in S213), the DCM 20 determines that the device is anomalous (S214). Then, the DCM 20 sends to the center server 30 an anomalous notification indicating that the DCM 20 is anomalous (S215). Then, the test mode ends (see S223 in FIG. 9).

In a case where, in the above determination, the DCM 20 determines that the command it has received is not a valid command but is an invalid command (NO in S213), the DCM 20 determines that the device is normal (S216). Then, the DCM 20 sends to the center server 30 a normal notification indicating that the DCM 20 is normal (S217).

Next, the center server 30 determines whether or not it has received a normal notification from the DCM 20 (S111). In a case where the center server 30 determines that it has received a normal notification from the DCM 20 (YES in S111), the center server 30 determines that the device is normal (S112).

In a case where, in the above determination, the center server 30 determines that it has not received a normal notification☐that is, that it has received an anomalous notification☐from the DCM 20 (NO in S111), the center server 30 determines that the device is faulty (S113). Then, the center server 30 ends the information collection process (see FIG. 9).

As shown in FIG. 9, the center server 30 next sends an HTTPS communication request that is a valid command (S114).

The DCM 20 determines whether or not the HTTPS communication request it has received from the center server 30 is a valid command (S218). In a case where the DCM 20 determines that the command it has received is a valid command (YES in S218), the DCM 20 determines that the device is normal (S219). Then, the DCM 20 sends a normal notification indicating that the DCM 20 is normal together with the anomaly information to the center server 30 (S220).

In a case where, in the above determination, the DCM 20 determines that the command it has received is not a valid command but is an invalid command (NO in S218), the DCM 20 determines that the device is anomalous (S221). Then, the DCM 20 sends to the center server 30 an anomalous notification indicating that the DCM 20 is anomalous (S222).

Then, after the DCM 20 sends the normal notification or the anomalous notification to the center server 30, the DCM 20 ends the test mode (S223) and ends the information provision process.

The center server 30 determines whether or not it has received a normal notification from the DCM 20 (S115). In a case where the center server 30 determines that it has received a normal notification from the DCM 20 (YES in S115), the center server 30 determines that the device is normal (S116). Then, the center server 30 acquires the anomaly information it has received together with the normal notification (S117).

In a case where, in the above determination, the center server 30 determines that it has not received a normal notification☐that is, that it has received an anomalous notification☐from the DCM 20 (NO in S115), the DCM 20 determines that the device is faulty (S118). Then, the center server 30 ends the information collection process.

(Summary of First Embodiment)

The center server 30 of this embodiment detects whether or not the DCM 20 is faulty by communicating with the DCM 20 that has switched to the test mode. Specifically, the detection of whether the DCM 20 is normal or anomalous is performed by the following steps (1) to (4).

(1) HTTPS Communication Request to Which Invalid Certificate is Attached (First Message Transmission)

The center server 30 sends, as a message to the DCM 20, an HTTPS communication request to which it has attached an invalid certificate. Then, in a case where the DCM 20 determines that the certificate it has received is valid, the DCM 20 sends to the center server 30 an anomalous notification indicating that the DCM 20 is anomalous. Consequently, with the first message transmission, the center server 30 can grasp a fault where a communication session is established by an invalid certificate. Furthermore, when collecting the anomaly information at the time of a security attack, the center server 30 can exclude, from the collection target, anomaly information relating to communication caused by a fault where a communication session is established by an invalid certificate.

(2) HTTPS Communication Request to Which Valid Certificate is Attached (Second Message Transmission)

The center server 30 sends, as a message to the DCM 20, an HTTPS communication request to which it has attached a valid certificate. Then, in a case where the DCM 20 determines that the certificate it has received is valid, the DCM 20 sends to the center server 30 a normal notification indicating that the DCM 20 is normal. Consequently, with the second message transmission, the center server 30 can grasp a fault where a communication session is not established by a valid certificate. Furthermore, when collecting the anomaly information at the time of a security attack, the center server 30 can exclude, from the collection target, anomaly information relating to communication caused by a fault where a communication session is not established by a valid certificate.

(3) HTTPS Communication Request that is an Invalid Command (Third Message Transmission)

The center server 30 sends, as a message to the DCM 20, an HTTPS communication request that is an invalid command. Then, in a case where the DCM 20 determines that the command it has received is a valid command, the DCM 20 sends to the center server 30 an anomalous notification indicating that the DCM 20 is anomalous. Consequently, with the third message transmission, the center server 30 can grasp a fault where an invalid command is recognized as a valid command. Furthermore, when collecting the anomaly information at the time of a security attack, the center server 30 can exclude, from the collection target, anomaly information relating to communication caused by a fault where an invalid command is recognized as a valid command.

(4) HTTPS Communication Request that is a Valid Command (Fourth Message Transmission)

The center server 30 sends, as a message to the DCM 20, an HTTPS communication request that is a valid command. Then, in a case where the DCM 20 determines that the command it has received is a valid command, the DCM 20 sends to the center server 30 a normal notification indicating that the DCM 20 is normal. Consequently, with the fourth message transmission, the center server 30 can grasp a fault where a valid command is recognized as an invalid command. Furthermore, when collecting the anomaly information at the time of a security attack, the center server 30 can exclude, from the collection target, anomaly information relating to communication caused by a fault where a valid command is recognized as an invalid command.

According to this embodiment, with the first and second message transmissions, communication anomalies before an HTTPS communication session is established can be diagnosed. Because of this, information where an attacker has tried to infiltrate the network of the vehicle 12 can be promptly collected. Furthermore, with the third and fourth message transmissions, communication anomalies after an HTTPS communication session has been established can be diagnosed. Because of this, information where there is a high probability that an attacker has succeeded in infiltrating the network of the vehicle 12 can be collected with even greater accuracy.

Furthermore, in this embodiment, in the first message transmission the center server 30 sends a request that violates the predetermined communication method because it has an invalid certificate, and in the second message transmission the center server 30 sends a request that conforms to the predetermined communication method because it has a valid certificate. Out of all communication patterns, the number of patterns that invalid certificates follow is greater than the number of patterns that certificates regarded as valid follow, so many faults can be detected first with the first message transmission. Additionally, in a case where a fault in the DCM 20 was able to be detected with the first message transmission, the second message transmission becomes unnecessary. For that reason, according to this embodiment, the packets of the DCM 20 in the test mode can be reduced and the diagnostic time of the DCM 20 can be shortened.

Similarly, in this embodiment, in the third message transmission the center server 30 sends a request using an invalid command, and in the fourth HTTPS communication the center server 30 sends a request using a valid command. Out of all communication patterns, the number of patterns that invalid commands follow is greater than the number of patterns that valid commands follow, so many faults can be first detected with the third message transmission. Additionally, in a case where a fault in the DCM 20 was able to be detected with the third message transmission, the fourth message transmission becomes unnecessary. For that reason, according to this embodiment, the packets of the DCM 20 in the test mode can be reduced and the diagnostic time of the DCM 20 can be shortened.

As described above, according to this embodiment, detection accuracy pertaining to a fault in the DCM 20 can be enhanced with plural message transmissions, and anomaly information relating to communication attributable to a device in the vehicle 12 can be excluded so that the anomaly information at the time of a security attack from outside the vehicle can be collected.

Moreover, in the information collection system 10 of this embodiment, in the DCM 20 the diagnostic unit 250 starts the diagnosis in a case where the safety of the vehicle 12 will not be affected, and the determination unit 260 executes the process to determine the state of the DCM 20 based on the messages it has received from the center server 30. When the DCM 20 has switched to the test mode and diagnosis has been started, there is the potential for the security of the DCM 20 to be vulnerable due to the invalid certificate and the invalid command being sent. However, according to this embodiment, by collecting the anomaly information at the time of a security attack in a case where the safety of the vehicle 12 will not be affected, safety with respect to driving of the vehicle 12 can be ensured.

It will be noted that in this embodiment the state of the DCM 20 was determined using certificates in the first and second message transmissions. In other words, in this embodiment, the HTTPS communication request to which an invalid certificate is attached corresponds to a message outside of the predetermined communication method. However, the information collection system is not limited to this, and a message accompanied by protocol anomalies and data anomalies may also serve as the message outside of the predetermined communication method. Here, protocol anomalies include cases where the TSL version is different and cases where the protocol is unsupported. Furthermore, data anomalies include cases where the data is unsupported, cases where the attached message authentication code is anomalous, and cases where the data length is anomalous.

Second Embodiment

In the first embodiment, the center server 30 collected the anomaly information by sending, in the first and second message transmissions, HTTPS communication requests to which it attached certificates. In contrast, in a second embodiment, the center server 30 is configured to collect the anomaly information by sending messages that follow a prescribed rule or are outside of the prescribed rule. It will be noted that the configurations of this embodiment are the same as those of the first embodiment, and description of those configurations will be omitted.

In this embodiment, a prescribed rule pertaining to the transmission of the messages is set beforehand for communication with the center server 30 in a case where the DCM 20 has switched to the test mode. For example, suppose that the prescribed rule is that the center server 30 send a message A n-times and thereafter sends a message B m-times. In this case, the DCM 20 is determined to be normal in a case where the DCM 20 receives the message A n-times and thereafter receives the message B m-times.

It will be noted that the prescribed rule is not limited to this. For example, a dummy command not used in real communication (i.e., communication outside the test mode) may also be set as the prescribed rule.

(Control Flow)

An example of the flow of the information provision process executed by the DCM 20 and the information collection process executed by the center server 30 in this embodiment will be described using the flowcharts of FIG. 10 and FIG. 11.

Figure 10:
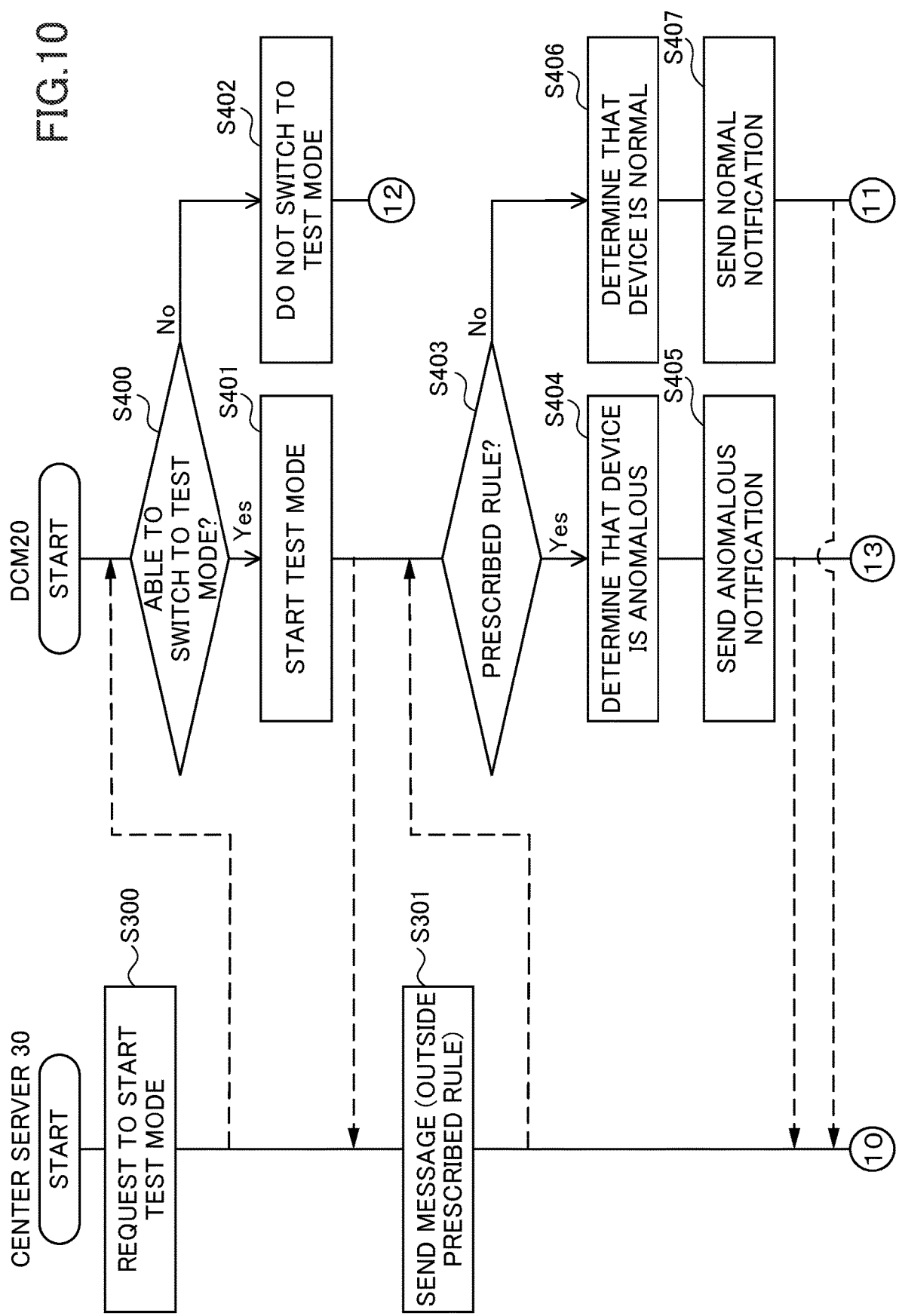
FIG. 10 is a flowchart showing the flow of the information provision process executed by the DCM and the information collection process executed by the center server in a second embodiment.

The processes of S300 and S400 to S402 shown in FIG. 10 are the same as the processes of S100 and S200 to S202 in FIG. 6. In a case where, in the determination of S400, the DCM 20 determines that it is unable to switch to the test mode (NO in step S400), the DCM 20 does not switch to the test mode (S402) and ends the information provision process (see FIG. 11).

When the center server 30 receives from the DCM 20 the command indicating that the DCM 20 has started the test mode, the center server 30 sends a message that is outside of the prescribed rule (S301).

When the DCM 20 receives the message from the center server 30, the DCM 20 determines whether or not the message follows the prescribed rule (S403). In a case where the DCM 20 determines that the message follows the prescribed rule (YES in S403), the DCM 20 determines that the device is anomalous (S404). Then, the DCM 20 sends to the center server 30 an anomalous notification indicating that the DCM 20 is anomalous (S405).

In a case where, in the above determination, the DCM 20 determines that the message does not follow the prescribed rule but is outside of the prescribed rule (NO in S403), the DCM 20 determines that the device is normal (S406). Then, the DCM 20 sends to the center server 30 a normal notification indicating that the DCM 20 is normal (S407).

Figure 11:
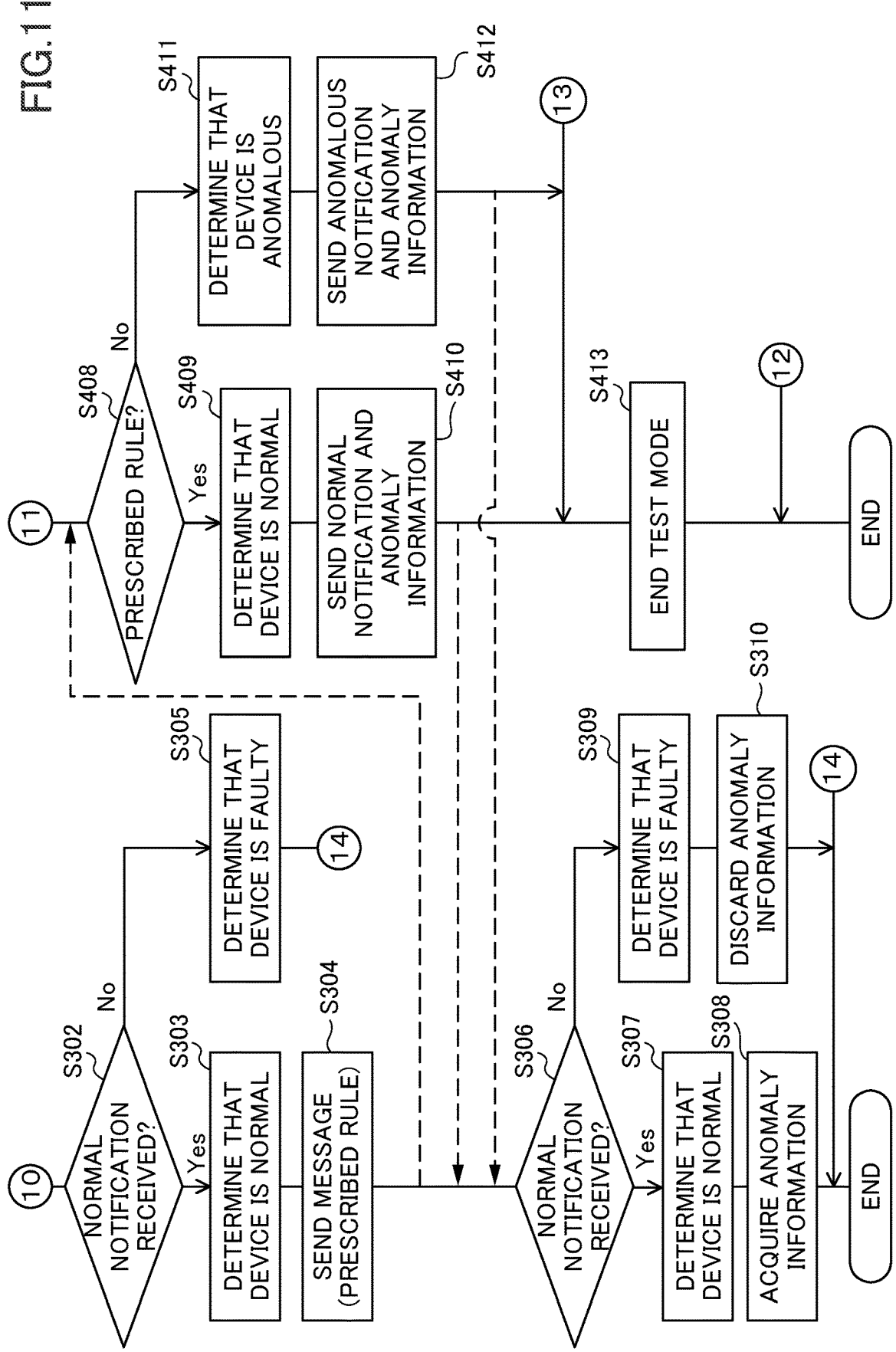
FIG. 11 is a flowchart (continued from FIG. 10) showing the flow of the information provision process executed by the DCM and the information collection process executed by the center server in the second embodiment.

As shown in FIG. 11, next, the center server 30 determines whether or not it has received a normal notification from the DCM 20 (S302). In a case where the center server 30 determines that it has received a normal notification from the DCM 20 (YES in S302), the center server 30 determines that the device is normal (S303). Then, the center server 30 sends a message that follows the prescribed rule (S304).

In a case where, in the above determination, the center server 30 determines that it has not received a normal notification☐that is, that it has received an anomalous notification☐from the DCM 20 (NO in S302), the center server 30 determines that the device is faulty (S305). Then, the center server 30 ends the information collection process.

When the DCM 20 receives the message from the center server 30, the DCM 20 determines whether or not the message follows the prescribed rule (S408). In a case where the DCM 20 determines that the message follows the prescribed rule (YES in S408), the DCM 20 determines that the device is normal (S409). Then, the DCM 20 sends a normal notification indicating that the DCM 20 is normal together with the anomaly information to the center server 30 (S410).

In a case where, in the above determination, the DCM 20 determines that the message does not follow the prescribed rule but is outside of the prescribed rule (NO in S408), the DCM 20 determines that the device is anomalous (S411). Then, the DCM 20 sends an anomalous notification indicating that the DCM 20 is anomalous together with the anomaly information to the center server 30 (S412).

Then, after the DCM 20 sends the normal notification or the anomalous notification to the center server 30, the DCM 20 ends the test mode (S413) and ends the information provision process.

Next, the center server 30 determines whether or not it has received a normal notification from the DCM 20 (S306). In a case where the center server 30 determines that it has received a normal notification from the DCM 20 (YES in S306), the center server 30 determines that the device is normal (S307). Then, the center server 30 acquires the anomaly information it has received together with the normal notification (S308) and ends the information collection process.

In a case where, in the above determination, the center server 30 determines that it has not received a normal notification☐that is, that it has received an anomalous notification☐from the DCM 20 (NO in step S306), the center server 30 determines that the device is faulty (S309). Then, the center server 30 discards the anomaly information that it received together with the anomalous notification (S310) and ends the information collection process.

(Summary of Second Embodiment)

As described above, in this embodiment also, detection accuracy pertaining to a fault in the DCM 20 can be enhanced by plural message transmissions, and anomaly information relating to communication attributable to a device in the vehicle 12 can be excluded so that the anomaly information at the time of a security attack from outside the vehicle can be collected. Furthermore, according to this embodiment, by collecting the anomaly information at the time of a security attack in a case where the safety of the vehicle 12 will not be affected, safety with respect to the safety of the vehicle 12 can be ensured.

Furthermore, in this embodiment, the anomaly information is sent from the DCM 20 to the center server 30, regardless of whether the DCM 20 is normal or anomalous, in response to the second message. The center server 30 discards the anomaly information in a case where it has acquired the anomaly information in spite of the fact that the DCM 20 is faulty, whereby anomaly information accompanying a fault in the device can be excluded from the collection when analyzing a security attack.

Third Embodiment

In the first and second embodiments, the center server 30, which is an information collection device, acquired the anomaly information relating to communication in the DCM 20, which is a control device. In contrast, in a third embodiment, the vehicle diagnostic device 40 serves as the information collection device, and the central GW 22 serves as the control device.

The hardware configurations and functional configurations of the central GW 22 of this embodiment are the same as those of the DCM 20 of the first embodiment except that the communication unit is wired.

Figure 12:
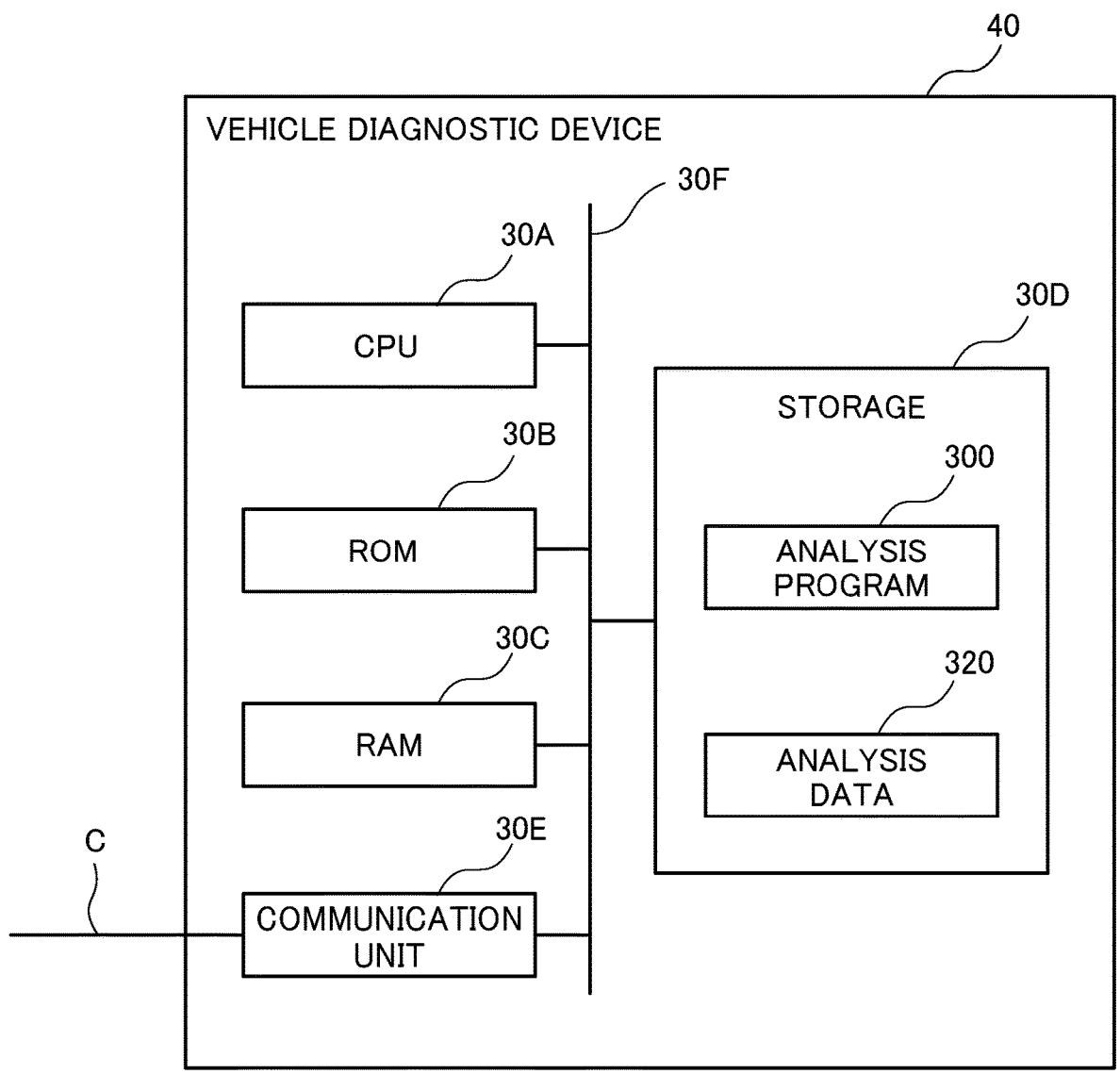
FIG. 12 is a block diagram showing hardware configurations of a vehicle diagnostic device of a third embodiment.

Furthermore, the hardware configurations and functional configurations of the vehicle diagnostic device 40 of this embodiment are the same as those of the center server 30 of the first embodiment except that the communication unit is wired. Specifically, as shown in FIG. 12, the communication unit 30E of the vehicle diagnostic device 40 is connected to the cable C. A wired communication standard such as Ethernet (registered trademark) or FDDI, for example, is applied to the communication unit 30E.

Consequently, in this embodiment, the vehicle diagnostic device 40 can communicate with the central GW 22 to acquire anomaly information pertaining to security attacks, such as unauthorized access, on the central GW 22. The vehicle diagnostic device 40 in this case executes the same information collection process as the center server 30 of the first embodiment, and the central GW 22 executes the same information provision process as the DCM 20 of the first embodiment. According to this embodiment, action and effects that are the same as those of the first embodiment can be provided.

Remarks

It will be noted that the processes that the CPU 20A executed by reading software (programs) and the processes that the CPU 30A executed by reading software (programs) in the above embodiments may also be executed by various types of processors other than CPUs. Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the processes may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in the above embodiments, the programs were described as being stored (installed) beforehand in computer-readable non-transitory recording media. For example, in the DCM 20 of the vehicle 12 the execution program 200 is stored beforehand in the ROM 20B. Furthermore, in the center server 30 the analysis program 300 is stored beforehand in the storage 30D. However, the programs are not limited to this and may also be provided in a form in which they are recorded in a non-transitory storage medium such as a compact disc read-only memory (CD-ROM), a digital versatile disc read-only memory (DVD-ROM), and a universal serial bus (USB) memory. Furthermore, the programs may also take a form in which they are downloaded via a network from an external device.

The flows of the processes described in the above embodiments are also examples, and unnecessary steps may be omitted therefrom, new steps may be added thereto, and their process orders may be changed in a range that does not depart from the spirit of the disclosure.

What is claimed is:

1. An information collection device comprising a hardware processor and a communication unit that communicates with a control device installed at a vehicle, the hardware processor being configured to:
send a message in a specific way to the control device, the control device being in a test mode;
receive from the control device a determination result about a state of the control device which has been determined based on the message sent in the specific way;
send another message in a usual way to the control device in a case in which the determination result indicates that the state of the control device is normal; and
receive, from the control device, anomaly information relating to communication in the control device, in response to the other message sent in the usual way.

2. The information collection device of claim 1, wherein the hardware processor:
sends the message to the control device outside of a predetermined communication method as the specific way, and
receives from the control device a determination result in which the state of the control device has been determined to be normal based on the message sent outside of the predetermined communication method.

3. The information collection device of claim 2, wherein the hardware processor:
in a case in which the determination result based on the message sent outside of the predetermined communication method indicates that the state of the control device is normal, sends the other message to the control device using the predetermined communication method as the usual way, and
receives the anomaly information from the control device as a result of the state of the control device having been determined to be normal based on the message sent using the predetermined communication method.

4. The information collection device of claim 1, wherein the hardware processor:
sends to the control device an invalid message as the message sent in the specific way, and
receives from the control device a determination result in which the state of the control device has been determined to be normal based on the invalid message.

5. The information collection device of claim 4, wherein the hardware processor:
in a case in which the determination result based on the invalid message indicates that the state of the control device is normal, sends a valid message as the other message sent in the usual way, and
receives the anomaly information sent from the control device as a result of the state of the control device having been determined to be normal based on the valid message.

6. The information collection device of claim 1, wherein, in a case in which the hardware processor is acquiring the anomaly information in a case in which the state of the control device is anomalous, the hardware processor discards the anomaly information.

7. An information collection system comprising the information collection device of claim 1 and a control device that controls a vehicle, wherein the information collection system is configured to:
when the control device is in the test mode: diagnose the control device in a case in which safety of the vehicle will not be affected, and
execute a process to determine the state of the control device based on the messages received from the information collection device.

8. The information collection system of claim 7, wherein the control device executes a process to prohibit driving of the vehicle in the test mode.

9. The information collection system of claim 7, wherein the control device, in a case in which the vehicle which is stopped moves during the diagnosis in the test mode, stops the test mode and allows usual driving of the vehicle.

10. An information collection method by which an information collection device connected to a control device installed at a vehicle collects information about the control device by communicating with the control device, the information collection method comprising a computer performing a process of:

sending a message in a specific way to the control device that is in a test mode;

receiving from the control device a determination result about a state of the control device which has been determined based on the message sent in the specific way;

sending another message in a usual way to the control device in a case in which the determination result indicates that the state of the control device is normal; and receiving, from the control device, anomaly information relating to communication in the control device, in response to the other message sent in the usual way.

11. A non-transitory storage medium storing a program by which an information collection device connected to a control device installed at a vehicle collects information about the control device by communicating with the control device, the program being executable by a computer to perform a process comprising:

sending a message in a specific way to the control device that is in a test mode;

receiving from the control device a determination result about a state of the control device which has been determined based on the message sent in the specific way;

sending another message in a usual way to the control device in a case in which the determination result indicates that the state of the control device is normal; and receiving, from the control device, anomaly information relating to communication in the control device, in response to the other message sent in the usual way.

* * * * *